March 31, 1970          G. L. NELSON          3,503,593
APPARATUS FOR PROMOTING DISSOLVING OF GAS IN LIQUID
Original Filed Oct. 2, 1967
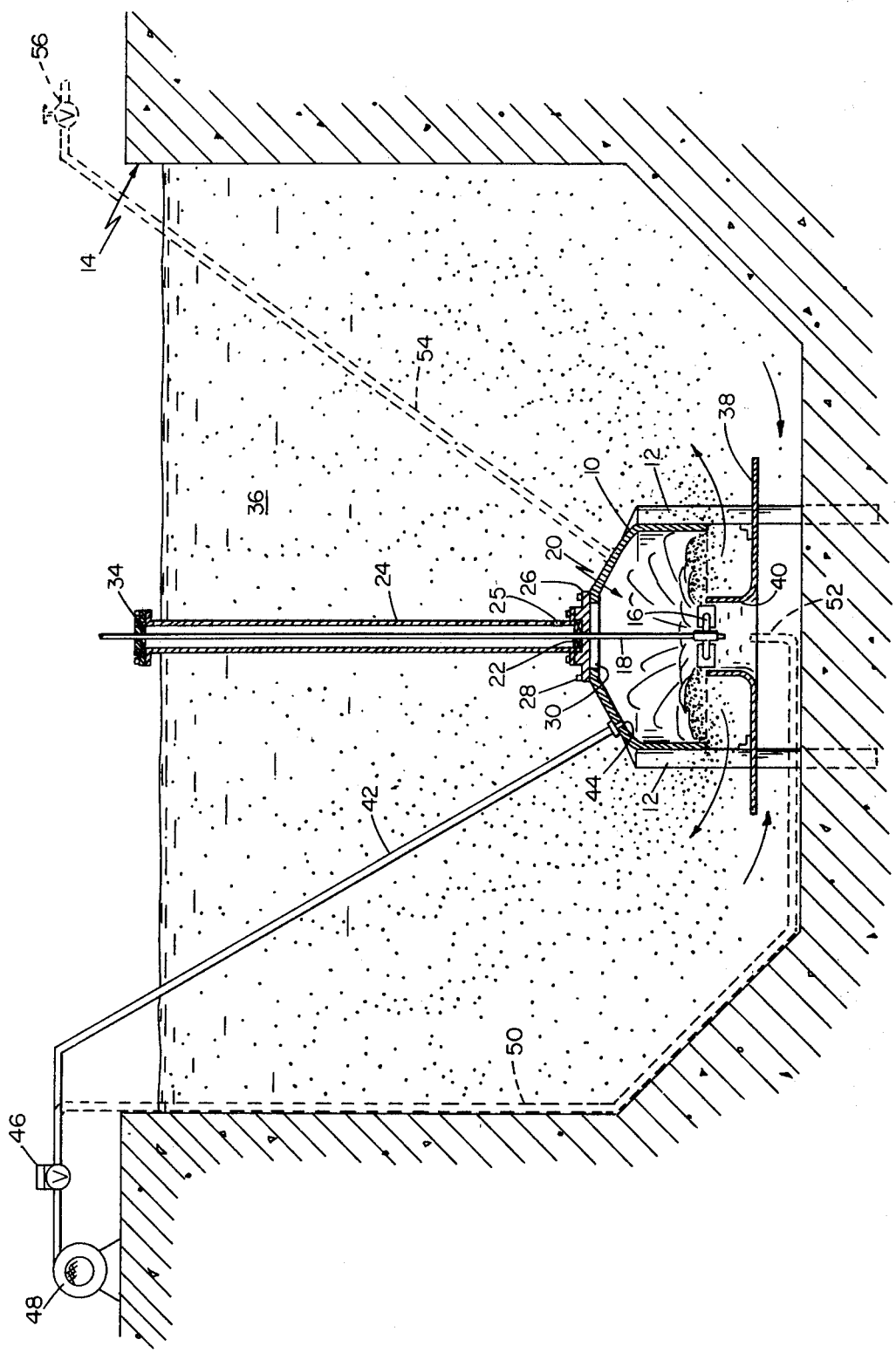

3,503,593
APPARATUS FOR PROMOTING DISSOLVING
OF GAS IN LIQUID
George L. Nelson, Westwood, Mass., assignor to Bird
Machine Company, South Walpole, Mass., a corporation of Massachusetts
Continuation of application Ser. No. 672,031, Oct. 2, 1967.
This application June 4, 1969, Ser. No. 830,378
Int. Cl. B01f 3/04, 7/16
U.S. Cl. 261—29                                      6 Claims

ABSTRACT OF THE DISCLOSURE

Apparatus for promoting dissolving gas in liquid has an impeller housing forming a chamber having its bottom at least about 12 feet below the surface of the liquid and exposed thereto, the chamber being capable of holding therein a body of gas under pressure up to the hydrostatic head of external liquid. The gas is supplied to the chamber to maintain a desired pressure of at least about 5 p.s.i. in the chamber. The impeller operates in the liquid exposed to the chamber to agitate and circulate it in and out of the chamber to expose it to the gas. At the superatmospheric pressure involved, dissolution of the gas takes place at a greatly increased rate. Control of the pressure enables control of the liquid level with respect to the impeller.

---

This application is a continuation of my copending application Ser. No. 672,031, filed Oct. 2, 1967 and now abandoned.

This invention concerns apparatus for promoting assimilation of gas by liquids by agitation of the liquid in the presence of the gas to be introduced therein. A particularly important application of the invention is to the aeration of sewage and industiral wastes in the aerobic treatment thereof.

Up to now large scale gas treatment of liquid as in sewage aeration has been effected by two principal methods. In one of these, the "diffusion" method, air under superatmospheric pressure is forced into the liquid through finely porous distributors located below the surface thereof. The distributors used in this process have proved difficult to maintain in adequate operating condition because of plugging of the pores and also require high gas compression to force it through the fine pores of the distributor. The other principal method, known as "mechanical" aeration, utilizes impellers to agitate the liquid extensively in the presence of air to produce large surface area exposure of liquid to air. The impeller may be a "surface aerator" located at the interface between the liquid and atmosphere or it may be located entirely beneath the liquid surface, air being fed to the liquid in the region of the impeller, either by suction induced by the action of the impeller or through a pressure line discharging into the liquid.

Surface aerators are generally recognized as most effective but are subject to disadvantages such as inadequate circulation, fluctuations in liquid level with respect to the impeller, difficulty in varying the position of the impeller with reference to the liquid level, and icing in cold climates.

The object of this invention is to provide novel equipment of the type concerned (herein called "aerators") which is of the mechanical aerator type but combines certain advantages of both surface aerators and diffusion aerators while overcoming certain disadvantages thereof, with resultant improvement in efficiency over that heretofore obtainable.

The aerator of this invention feautres a housing for the impeller which is exposed to the liquid at the bottom but which forms a gas pressure tight chamber around and about the impeller. The bottom of the housing is located sufficiently below the liquid surface to enable a substantially constant superatmospheric gas pressure to be maintained in the chamber by suppling the gas thereto at least at the rate of its assimilation by the liquid, thereby maintaining the liquid in the chamber at a substantially constant level at which the gas pressure is balanced by the hydrostatic head of external liquid. The impeller is of such design as to produce large surface area exposure of liquid to the gas in the chamber, the impeller being spaced from the chamber wall sufficiently to permit the requisite circulation of liquid induced by the impeller, which is preferably in the direction from the impeller outwardly toward and out under the surrounding chamber wall.

For a given rate of exposure of liquid to gas, exposure under superatmospheric pressure increases the rate at which the gas or soluble components thereof dissolve in the liquid, the increase being proportional to the pressure, in aeration this being the rate of oxygen transfer. For a given circulation rate the horsepower requirements of the impeller operating under superatmospheric gas pressure are not increased as compared with operation under atmospheric pressure. Consequently, when sufficient superatmospheric pressure of gas is maintained in the chamber, substantial savings are effected in meeting gas transfer requirements, and these savings are much greater than the cost of compressing the gas. The rate of transfer may be still further increased by utilizing an impeller which generates a substantial volume of spray much of which impinges upon the chamber wall and flows down the wall as a film exposed to the gas, conditions highly favorable to thorough surface exposure and rapid transfer by solution.

In addition to transfer by solution within the chamber, substantial quantities of gas are entrapped as bubbles in the liquid. Large bubbles are too buoyant to escape beneath the chamber wall and so the chamber acts as a classifier, permitting only small bubbles to escape. These small bubbles, similar to those produced in the diffusion process, do not rise rapidly and may circulate beneath the surface of the liquid in the currents induced by the impeller. Transfer from these small bubbles of pressurized gas, which is the mechanism utilized in the diffusion process, still further increases the transfer rate advantage of the aerator of the present invention over prior devices.

As compared with surface aerators in which the impeller operates at the interface of the liquid with the atmosphere, the aerator of this invention has the further advantages that it is not subject to icing problems in cold climates and is not affected by waves which may be produced at the surface by winds or by fluctuations in liquid level caused by variations in feed or overflow rates which may be offset by proper pressure adjustment. Such conditions vary the impeller load and impair the operation of surface aerators, occasionally even to the point of breakdown. By regulating the pressure within the chamber in the aerator of the present invention, the level of liquid within the chamber to which the impeller is exposed may be maintained substantially constant. Furthermore, the position of the impeller relative to the liquid level may be adjusted and maintained as desired simply by adjusting the pressure in the chamber, an important advantage since with prior aerators it has been necessary to resort to relatively difficult, complex and expensive adjustments of the position of the impeller or of the level of the liquid body as a whole, or both, and such adjustments may frequently be desirable.

The housing and impeller assembly may be supported in operating position in the liquid by attachment to fixed support structure in the tank, lagoon or other container or by suspension from bridges above the body of liquid or from floats or pontoons, as in the case of surface aerators. By locating the assembly close to the bottom, the use of costly draft tubes may be dispensed with, these being required in many surface aerator installations to obtain adequate liquid circulation at the bottom.

The single figure of the accompanying drawing shows in vertical cross-section an embodiment of the invention mounted on fixed structure in a tank. While only a single aerator is shown, it will be understood that a series thereof may be provided in a single body of liquid, depending on the volume of the body and the capacity of the aerator.

Referring to the drawing, the embodiment selected for illustrating the invention has a cup or bell shaped housing 10 inverted to provide an open bottom and supported on beams 12 extending upward from the bottom of the tank 14. An impeller 16 is mounted on shaft 18 disposed centrally of the gas chamber 20 formed by the housing. Shaft 18 extends upwardly through a bearing and seal assembly indicated at 22 in the bottom of a tube 24 which is filled with the liquid 36 through opening 25. Lateral flanges 26 at the base of tube 24 are attached by bolts 28 to the portion of housing 10 surrounding an opening 30 in the mid portion of the housing. Shaft 18 extends upwardly through tube 24 and a second bearing 34 at the upper end thereof which is disposed above the level of the liquid body 36. Drive connections for the shaft (not shown) may include a motor mounted on a bridge structure above the liquid and rotatably coupled to the shaft.

Should it become necessary to service the impeller, bolts 28 may be loosened and the assembly of impeller, its shaft and support tube 24 lifted upwardly, opening 30 being large enough to permit the impeller to pass therethrough so that the assembly may be lifted in entirety out of the tank.

A baffle member 38 mounted on beams 12 below housing 10 serves to guide the flow of liquid along the bottom, upwardly through a tubular central portion 40 surrounding the impeller and outwardly beneath the under edge of the housing, as indicated by the arrows. For reasons previously mentioned, impeller 16 is preferably constructed and arranged to form a substantial part of the liquid flowing upwardly therethrough into spray which is projected against the inner wall of housing 10 to form thereon a falling film.

Gas under pressure is supplied to chamber 20 through tube 42 which is sealed at one end about an opening 44 in housing 10 and is connected at the other end via pressure regulator 46 to a compressor 48 mounted at one side of the tank 14. Alternatively the gas may be supplied to the liquid flowing to the impeller via tube 50 indicated by dotted lines, tube 50 having an upwardly directed end 52 disposed centrally of tubular portion 40 of the baffle and being connected at the other end to compressor 48.

The amount of pressure that can be maintained in chamber 10 depends on the depth of the under edge of housing 10 below the surface of the liquid body 36, which should be at least about 12 feet below that surface. Where conditions permit greater depth is preferable, a preferred range being on the order of from 12 to 27 feet, corresponding to gage pressures of about 5 to 12 p.s.i. At such air pressures the solubility of oxygen in water is about 30% to 70% greater than at atmospheric pressure and the gain by way of horsepower reduction for a given rate of oxygen transfer is very great. Desirably for most efficient operation the pressure is regulated to maintain the liquid in the chamber at a predetermined level above the under edge of housing 10. However, the liquid may be maintained substantially level with the under edge of the housing simply by feeding excess pressure into the chamber, since pressure beyond that balanced by the liquid head will leak away as gas bubbles from under the housing.

Optionally, a gas bleed line may be provided from chamber 20 as indicated by dotted lines at 54 which opens to atmosphere through valve 56 so that build up of relatively insoluble components of a gas may be prevented by venting the chamber as required.

The shape and relative size of the impeller and its housing may vary widely according to liquid volume to be treated, shape and depth of liquid container, type of support structure used, etc. Just by way of example, if the tank 14 is assumed to be 30 feet square and about 20 feet deep, for aeration the impeller might be 3 feet in diameter and the housing 10 feet in diameter at the base. If the container were substantially larger or were a pond or a stream, these dimensions might be doubled or two or more assemblies provided, or housing 10 might be elongated to receive two or more impellers. The impeller may have paddle type blades as shown or other of the various shapes utilized in surface aerator impellers. In this regard it should be noted that the pumping action of the impeller under the pressure conditions involved is more effective than it would be at the surface of the body of the liquid. Baffle 38 is not essential but is desirable to promote proper circulation, and may have various forms other than that shown. In certain cases, it may be desirable to extend the housing so that its top lies above the surface of the liquid.

While the invention has a primary application to aeration, the invention may also be used to advantage with other gases, for example chlorine for chlorination of water or a mixture of chlorine and oxygen for simultaneous chlorination and oxidation.

I claim:

1. Apparatus for promoting dissolving of gas in a liquid which comprises an impeller, a housing for the impeller, means for mounting said housing in association with a body of liquid to form a chamber having its bottom disposed at least of the order of 12 feet below the surface of said body and exposed to the liquid thereof and otherwise closed for retaining therein gas under pressure up to the pressure of the hydrostatic head of liquid above the bottom of said chamber, means for supplying a treating gas to said chamber to maintain a selected gas pressure therein of at least of the order of 5 p.s.i. gage, and means for mounting said impeller to operate in the liquid exposed to said chamber thereby to draw liquid from said body into said chamber, agitate and expose it to the gas in said chamber and circulate it out of the chamber, said last named means including drive connections for operating the impeller.

2. Apparatus according to claim 1 wherein the impeller is rotated and arranged in a manner to project some of the liquid as spray against the inner walls of said chamber.

3. Apparatus according to claim 1 wherein said housing is adapted for mounting entirely below the surface of the liquid.

4. Apparatus according to claim 1 which includes a baffle member for mounting below said chamber to direct liquid flow with respect to said chamber.

5. Apparatus according to claim 1 which includes a tubular member and means for mounting the same below said impeller to guide the flow of liquid to the impeller.

6. Apparatus according to claim 1 wherein said gas supplying means includes means for varying the pressure of gas supplied to said chamber to adjust the level of liquid therein with reference to the impeller.

References Cited

UNITED STATES PATENTS

| 1,110,914 | 9/1914 | Feld | 261—91 |
| 1,374,500 | 4/1921 | Greenawalt | 261—93 |
| 3,092,678 | 6/1963 | Braun | 261—93 X |
| 3,341,450 | 9/1967 | Ciabattari et al. | 261—91 X |

HARRY B. THORNTON, Primary Examiner

S. H. MARKOWITZ, Assistant Examiner

U.S. Cl. X.R.

261—36, 91, 93